(12) United States Patent
Sato et al.

(10) Patent No.: US 6,675,232 B1
(45) Date of Patent: Jan. 6, 2004

(54) VEHICLE-LOADED AUDIO DEVICE HAVING A COMMON CONTROLLER

(75) Inventors: Katsunori Sato, Iwaki (JP); Koichi Izumi, Iwaki (JP); Kenji Ouchida, Iwaki (JP)

(73) Assignee: Alpine Elecetronics, Inc., Tolyo (JP)

( * ) Notice: Subject to any disclaimer, the term of this patent is extended or adjusted under 35 U.S.C. 154(b) by 0 days.

(21) Appl. No.: 09/323,713

(22) Filed: Jun. 1, 1999

(30) Foreign Application Priority Data

Jun. 12, 1998 (JP) .......................................... 10-165369

(51) Int. Cl.⁷ ................................................ G06F 3/00
(52) U.S. Cl. ........................... 710/8; 340/425.5; 381/86
(58) Field of Search ............................... 710/2, 8, 317; 361/368, 801; 340/425.5; 381/86

(56) References Cited

U.S. PATENT DOCUMENTS

| | | | |
|---|---|---|---|
| 5,127,057 A | | 6/1992 | Chapman |
| 5,175,824 A | * | 12/1992 | Soderbery et al. .......... 710/317 |
| 5,175,926 A | * | 1/1993 | Chapman ..................... 29/830 |
| 5,550,459 A | * | 8/1996 | Laplace ....................... 323/255 |
| 5,554,966 A | * | 9/1996 | Iijima et al. ................. 340/687 |
| 5,794,164 A | * | 8/1998 | Beckert et al. ............. 455/3.06 |
| 5,953,302 A | * | 9/1999 | Kobayashi .................. 369/75.1 |
| 6,201,540 B1 | * | 3/2001 | Gallup et al. ................ 345/764 |
| 6,349,039 B1 | * | 2/2002 | Boe ............................. 361/801 |
| 6,445,576 B1 | * | 9/2002 | Wooden et al. ............. 361/683 |

* cited by examiner

Primary Examiner—Jeffrey Gaffin
Assistant Examiner—Eron Sorrell
(74) Attorney, Agent, or Firm—Brinks Hofer Gilson & Lione

(57) ABSTRACT

When manufacturing several types of player having different functions, as many components as possible are used in common to all the types of player so that the production cost is reduced. A main control circuit, including a flash ROM, and other common circuits are mounted on a main board. No programs are written in the flash ROM in the state where the player to be produced is not yet specified. In the manufacturing process for one of a cassette tape player, a CD player and an MD player, a corresponding one is selected from among drive mechanisms for those various players, a corresponding one is selected from among front panels, and a program for operating the selected drive mechanism and front panel in an adapted manner is written into the flash ROM. The selected drive mechanism, the selected front panel and the main board are attached to a main chassis. A connector for the drive mechanism and a connector for the front panel, the connectors being both provided on the main board, are connected to respective connection terminals of the drive mechanism and the front panel.

21 Claims, 2 Drawing Sheets

VEHICLE-LOADED AUDIO DEVICE HAVING A COMMON CONTROLLER

BACKGROUND OF THE INVENTION

1. Field of the Invention

The present invention relates to a vehicle-loaded audio device such as a cassette tape player, a CD player or an MD player, and more particularly to a vehicle-loaded audio device suitable for promoting common use of components and achieving a reduction of costs.

2. Description of the Related Art

Generally, a vehicle-loaded audio device comprises a drive mechanism for carrying out recording/playback on and from a medium (e.g., a cassette tape, CD or MD), a front panel provided with an opening for insertion of the medium and a plurality of control keys, a chassis for supporting the drive mechanism and the front panel, a main board attached to the chassis, and so on. Various circuit components, including a microcontroller, are mounted on the main board.

With such a variety of vehicle-loaded audio devices, front panels are different depending on each type of drive mechanism. For example, a front panel having a cassette insertion opening is employed for a cassette tape player, and a front panel having a disk insertion opening is employed for a CD player. Microcontrollers mounted on the main boards are also different depending on each type of drive mechanism. The microcontroller controls the operation of the drive mechanism in accordance with an input signal from any of control keys. disposed on the front panel. For those reasons, in the manufacturing process of several kinds of vehicle-loaded audio devices having different drive mechanisms, it has been customary to prepare respective sets of a front panel, a chassis and a main board which are specific to each type of drive mechanism, and to assemble the sets of components into the vehicle-loaded audio devices.

As an improvement on the above method, U.S. Pat. No. 5,127,057 discloses a manufacturing method for vehicle-loaded audio devices. According to the disclosed method, a sub-board mounting thereon a sub-microcontroller for controlling the operation of a drive mechanism for each of various players is attached to the corresponding drive mechanism, a sub-board mounting thereon a sub-microcontroller for controlling a display, etc. is attached to a front panel for each of the various players, and a main microcontroller for executing various functions common to the various players is mounted on a main board. When manufacturing a particular one of the various players, e.g., a cassette tape player, the drive mechanism for a cassette tape, the front panel for a cassette tape, and the main board are mechanically attached to a main chassis. The sub-board on the drive mechanism side and the sub-board on the front panel side are electrically connected to the main board, following which all the microcontrollers are interconnected by buses.

Such a manufacturing method for vehicle-loaded audio devices has advantages. By preparing the dedicated drive mechanism and the dedicated front panel for each type of player, and attaching the respective sub-boards mounting thereon the dedicated sub-microcontroller to the corresponding drive mechanism and front panel, the other components, i.e., the main board and the main chassis, are common to all the types of player. As compared with the case of preparing the front panel, the main chassis and the main board are dedicated for each drive mechanism, therefore, the total cost including design and development cost and a mold cost can be reduced.

In the related art disclosed in U.S. Pat. No. 5,127,057, however, the main microcontroller mounted on the main board is connected to the sub-microcontrollers on the drive mechanism side and the front panel side by the buses so that various operations of the drive mechanism are executed corresponding to particular keys disposed on the front panel. Accordingly, the main microcontroller on the main board can be common to all the types of player, but the dedicated sub-microcontrollers must be mounted on the drive mechanism and the front panel, respectively. This point has been a substantial obstacle in achieving a cost reduction.

SUMMARY OF THE INVENTION

According to the present invention, three components, i.e., one particular drive mechanism, a front panel corresponding to that drive mechanism and a main board, are attached to a main chassis, and at least the drive mechanism is connected to the main board with a connector. A writing unit into which a program for operating the drive mechanism and the other components in an adapted manner can be written, and a circuit unit common to various players are mounted on the main board. With such a construction, when manufacturing a particular product from among those various players, the main board and the main chassis can be used in common to all the types of product. Further, by writing a program into a flash ROM, which constitutes the writing unit, depending on the type of product when it is on a production line, a common microcontroller on the main board can execute the operation of the drive mechanism corresponding to the front panel. It is therefore possible to reduce the total cost including design and development cost and a mold cost to a large extent.

A vehicle-loaded audio device of the present invention comprises one selected from among drive mechanisms for various players, a front panel having an insertion opening for a medium corresponding to the selected one of the drive mechanisms, a main chassis for supporting the front panel and the drive mechanism, and a main board attached to the main chassis, the main board including a connector for connecting the main board and the drive mechanism, a writing unit into which a program for operating the drive mechanism and the other components in an adapted manner can be written, and a circuit unit common to the various players.

The front panel is required to have at least the insertion opening for the medium corresponding to the drive mechanism. In the case of the front panel being provided with at least one control key for operating the drive mechanism, when the front panel is connected to the main board with a connector, a common microcontroller on the main board can execute the operation of the drive mechanism in accordance with input manipulation of the control key.

The drive mechanism may be directly attached to the main chassis. By attaching the drive mechanism to the main chassis through an intermediate bracket, however, flexibility in attachment of each drive mechanism to the main chassis is improved.

Furthermore, a connection terminal of the drive mechanism may be directly connected to the connector on the main board. By connecting the drive mechanism to the main board with the connector through a flexible cable such as a flat cable or a wire, however, flexibility in connection of each drive mechanism to the main board is improved.

DESCRIPTION OF THE PREFERRED EMBODIMENT

Figure 1:
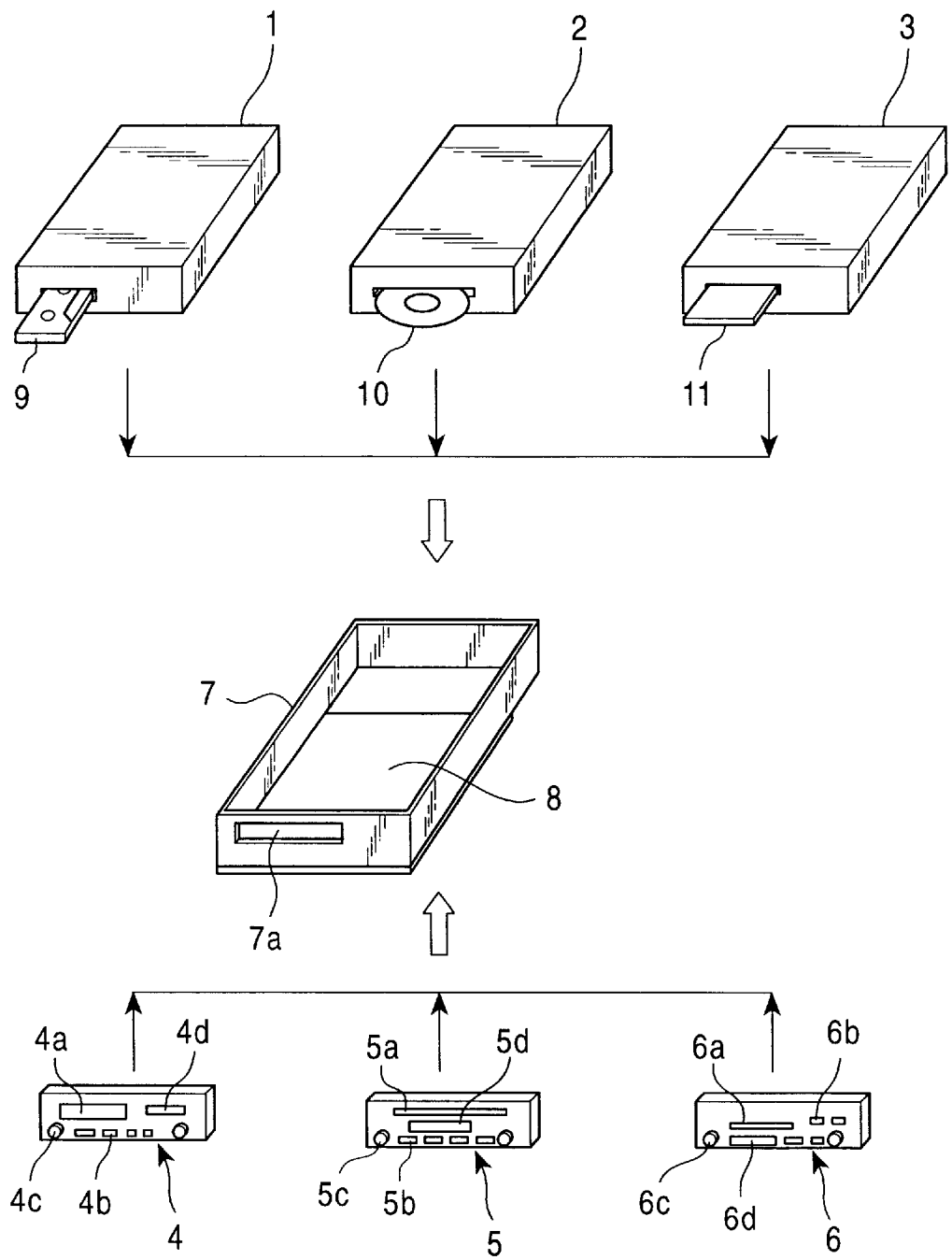
FIG. 1 is an explanatory view showing a manufacturing process of a vehicle-loaded audio device according to an embodiment of the present invention.
Figure 2:
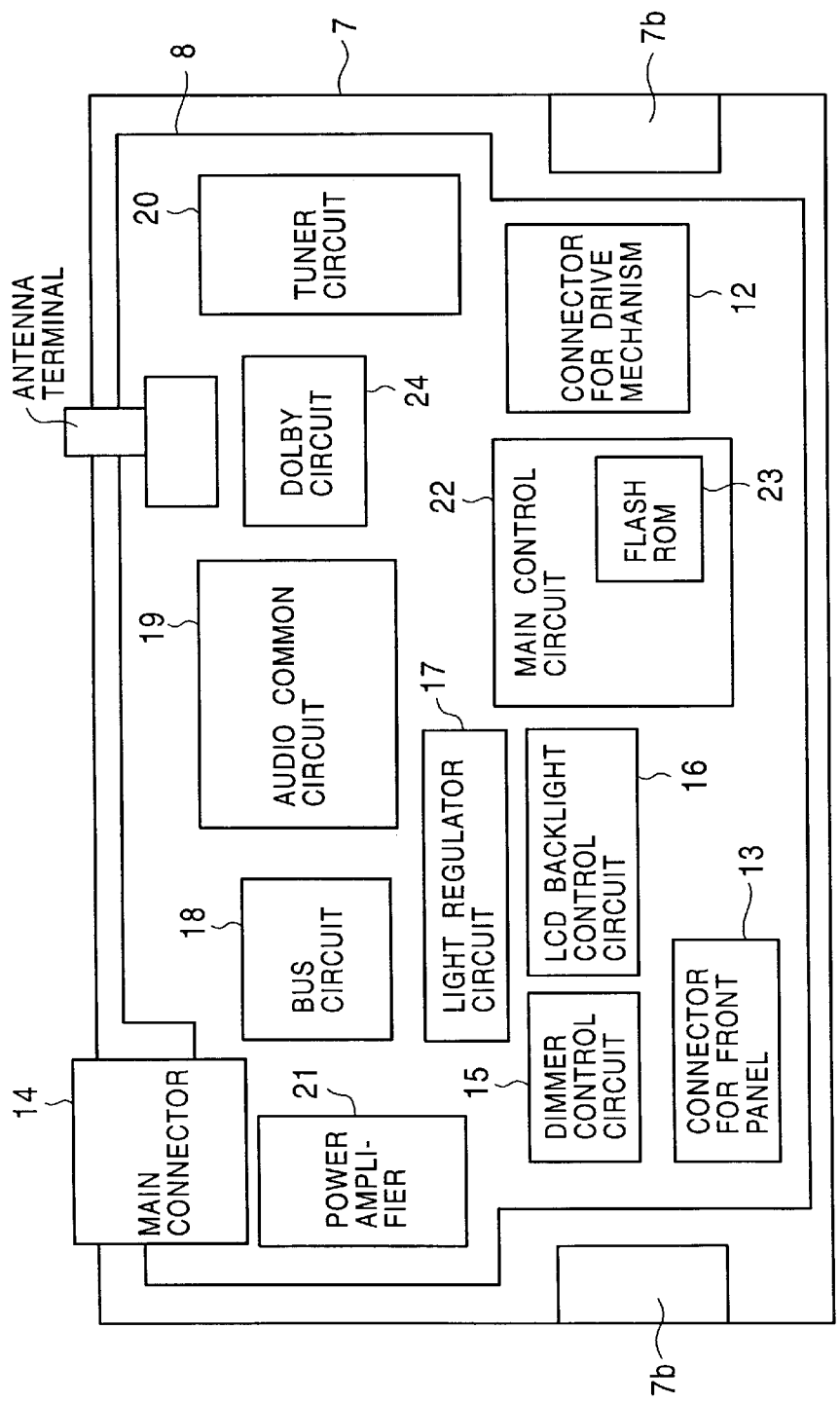
FIG. 2 is a block diagram for illustrating a main board provided in the vehicle-loaded audio device.

An embodiment of the present invention will be described with reference to the drawings. FIG. 1 is an explanatory view showing a manufacturing process for a vehicle-loaded audio device according to the embodiment, and FIG. 2 is a block diagram illustrating a main board provided in the vehicle-loaded audio device.

As shown in FIG. 1, when manufacturing a vehicle-loaded audio device according to the embodiment, various drive mechanisms 1, 2, 3 for a cassette tape player, a CD player and an MD player, various front panels 4, 5, 6 for the cassette tape player, the CD player and the MD player, a common main chassis 7, and a common main board 8 attached to the main chassis are prepared. One selected from among the drive mechanisms 1, 2, 3 and one selected from among the front panels 4, 5, 6 are attached to the main chassis 7 and connected to the main board 8 with connectors, whereby the vehicle-loaded audio device is completed.

Though not shown, the drive mechanism 1 incorporates a playback magnetic head for a cassette tape 9, a tape reel driving mechanism, etc.; the drive mechanism 2 incorporates a playback pickup for a CD 10, a turntable driving mechanism, etc.; and the drive mechanism 3 incorporates a recording/playback pickup for an MD 11, a turntable driving mechanism, etc. The front panel 4 corresponds to the drive mechanism 1. A cassette insertion opening 4a is formed in the front panel 4, while a plurality of control keys 4b and control knobs 4c, and an LCD (liquid crystal display) 4d are disposed on the front panel 4. The front panel 5 corresponds to the drive mechanism 2. A CD insertion opening 5a is formed in the front panel 5, while a plurality of control keys 5b and control knobs 5c, and an LCD 5d are disposed on the front panel 5. The front panel 6 corresponds to the drive mechanism 3. An MD insertion opening 6a is formed in the front panel 6, while a plurality of control keys 6b and control knobs 6c, and an LCD 6d are disposed on the front panel 6.

An insertion opening 7a is formed in a front wall of the main chassis 7, and is set to a size sufficient to encompass any of the cassette insertion opening 4a, the CD insertion opening 5a and the MD insertion opening 6a. As shown in FIG. 2, the main board 8 is attached to the main chassis 7 in a predetermined position by screwing or any other suitable means, and a pair of mount portions 7b are provided on the main chassis 7. A connector 12 for the drive mechanism, a connector 13 for the front panel, and a main connector 14 for external output are provided on the main board 8. A connection terminal of one of the drive mechanisms 1, 2, 3 is connected to the connector 12 for the drive mechanism, and a connection terminal of one of the front panels 4, 5, 6 is connected to the connector 13 for the front panel. Also, a dimmer control circuit 15, an LCD backlight control circuit 16, a light regulator circuit 17, a bus circuit 18, an audio common circuit 19, a tuner circuit 20, a power amplifier 21, a main control circuit 22, etc. are mounted, as common circuits to all the types of players, on the main board 8. The main control circuit 22 includes a flash ROM 23. Further, a Dolby circuit 24 is mounted, as a dedicated circuit to a cassette tape player, on the main circuit 8. The Dolby circuit 24 is omitted when one of the drive mechanisms 2, 3 not adapted for a cassette tape player is selected.

The main connector 14 includes a line connected to a vehicle side battery and an ACC cable, a line connecting a dimmer circuit (a circuit operating in response to on/off of headlights) and the dimmer control circuit 15, a line connected to the bus circuit 18 for communication with other devices, and lines for producing outputs to front and rear speakers. An output signal of the dimmer control circuit 15 is supplied through the light regulator circuit 17 to the LCD backlight control circuit 16 and the side of selected one of the front panels 4, 5, 6. Accordingly, when the headlights are turned on, lights associated with doors, the control keys 4b, 5b or 6b disposed on the front panel 4, 5 or 6, etc. are turned on, and the luminous intensity of the backlight of the front panel 4, 5 or 6 is reduced. In addition, the LCD backlight control circuit 16 is controlled by the main control circuit 22, and the backlight of the LCD 4d, 5d or 6d is turned on/off in accordance with a command from the main control circuit 22.

Though not shown, each of the front panels 4, 5, 6 mounts thereon an LCD driver, a key matrix circuit, rotary encoders, and so on. When an output signal from a predetermined one of the control keys 4b, 5b or 6b is supplied to the main control circuit 22, the main control circuit 22 controls the LCD driver to change the contents displayed on the LCD 4d, 5d or 6d. Also, when the rotary encoder is operated with one of the control knobs 4c, 5c or 6c, an output signal of the rotary encoder is supplied to the main control circuit 22, whereupon the main control circuit 22 controls the audio common circuit 19 to adjust, e.g., the magnitude of a voice signal inputted from the tuner circuit 20. Thus, sound is outputted at an adjusted level from the speakers through the power amplifier 21. A program corresponding to a selected one of the drive mechanisms 1, 2, 3 is written in the flash ROM 23. In accordance with the stored program, the main control circuit 22 causes the drive mechanism 1, 2 or 3 to execute the operation corresponding to a key input from any of the control keys 4b, 5b or 6b on the side of the front panel 4, 5 or 6.

Next, the process of manufacturing various types of player will be described in detail. In this embodiment, as described above, the main chassis 7 and the main board 8 are used as common components to all the types of player. No programs are written in the flash ROM 23 mounted on the main board 8 in the state where the player to be produced is not yet specified. In the manufacturing process for a cassette tape player, the drive mechanism 1 is selected from among the drive mechanisms 1, 2, 3, the front panel 4 is selected from among the front panels 4, 5, 6, and a program for operating the drive mechanism 1 and the front panel 4 in an adapted manner is written into the flash ROM 23. Then, the front panel 4 and the main board 8 are attached to the main chassis 7, and the drive mechanism 1 is attached to both the mount portions 7b of the main chassis 7. The connection terminal of the drive mechanism 1 and the connection terminal of the front panel 4 are connected respectively to the drive mechanism-mated connector 12 and the front panel-mated connector 13 both provided on the main board 8. In this case, the audio common circuit 19 is connected through the Dolby circuit 24 on the main board 8.

As an alternative, in the manufacturing process for a CD player, the drive mechanism 2 is selected from among the drive mechanisms 1, 2, 3, the front panel 5 is selected from among the front panels 4, 5, 6, and a program for operating the drive mechanism 2 and the front panel 5 in an adapted manner is written into the flash ROM 23. Then, the front panel 5 and the main board 8 are attached to the main chassis 7, and the drive mechanism 2 is attached to both the mount portions 7b of the main chassis 7. The connection terminal of the drive mechanism 2 and the connection terminal of the front panel 5 are connected respectively to the drive mechanism-mated connector 12 and the front panel-mated connector 13 both provided on the main board 8. In this case, the Dolby circuit 23 is omitted from the main board 8.

Further, in the manufacturing process for an MD player, the drive mechanism 3 is selected from among the drive mechanisms 1, 2, 3, the front panel 6 is selected from among the front panels 4, 5, 6, and a program for operating the drive mechanism 3 and the front panel 6 in an adapted manner is written into the flash ROM 23. Then, the front panel 6 and the main board 8 are attached to the main chassis 7, and the drive mechanism 3 is attached to both the mount portions 7b of the main chassis 7. The connection terminal of the drive mechanism 3 and the connection terminal of the front panel 6 are connected respectively to the drive mechanism-mated connector 12 and the front panel-mated connector 13 both provided on the main board 8. Also in this case, the Dolby circuit 23 is omitted from the main board 8.

With the embodiment described above, when a particular one of various players is manufactured, the main board 8 and the main chassis 7 can be used in common to all the types of product. Further, by writing a program into the flash ROM 23 depending on the type of product when it is on a production line, the common microcontroller on the main board can execute the operation of each drive mechanism in accordance with input manipulation of the control keys. The total cost including design and development cost and a mold cost can be therefore reduced to a large extent.

In the foregoing embodiment, the drive mechanisms 1, 2, 3 are each directly attached to both mount portions 7b of the main chassis 7. However, if the mount positions of the drive mechanisms 1, 2, 3 differ from one another, an intermediate bracket may be interposed between each of the drive mechanisms 1, 2, 3 and the mount portions 7b of the main chassis 7. Thus the difference in the mount positions of the drive mechanisms 1, 2, 3 can be accommodated just by replacing the intermediate bracket.

Also, in the foregoing embodiment, the connection terminals of the drive mechanisms 1, 2, 3 are each directly connected to the connector 12 for the drive mechanism, the connector 12 being provided on the main board 8. However, if the positions of the connection terminals of the drive mechanisms 1, 2, 3 differ from one another, the connection terminals of the drive mechanisms 1, 2, 3 may be each connected to the connector 12 for drive mechanism through a flexible cable such as a flat cable or a wire. Thus the use of a flexible cable can accommodate the difference in the layout positions of the connection terminals of the drive mechanisms 1, 2, 3 from the connector 12 for the drive mechanism.

While the foregoing embodiment has been described in connection with the case of selecting one from among three different types of players, i.e., a cassette tape player, a CD player and an MD player, similar advantages can be also obtained in the case of selecting one from among two or not less than four different types of players. The present invention is likewise applicable to a DVD player as well, for example, in addition to the above-mentioned players.

Further, while the foregoing embodiment has been described in connection with the front panel having both the medium insertion opening and the control keys, the present invention is also applicable to a front panel having no control keys. In this case, a drive mechanism corresponding to such a front panel can be made to execute various operations with the control keys disposed on the front panel for another type of player or through remote control. For example, when an MD player and a CD-ROM player for a navigation system are stacked in two stages one above the other, it is possible to employ a front panel having only a CD-ROM insertion opening for the CD-ROM player, and to cause a drive mechanism for the CD-ROM player to execute various operations in accordance with input manipulation of the control keys disposed on the front panel for the MD player.

The vehicle-loaded audio device of the present invention is implemented in the form described above and can provide the following advantages.

Three components, i.e., one particular drive mechanism, a front panel corresponding to that drive mechanism and a main board, are attached to a main chassis, and at least the drive mechanism is connected to the main board with a connector. A flash ROM into which a program for operating the drive mechanism and the other components in an adapted manner can be written, and a circuit unit common to various players are mounted on the main board. When manufacturing a particular product from among those various players, the main board and the main chassis can be used in common to all the types of product. Further, by writing a program into the flash ROM depending on the type of product when it is on a production line, the common microcontroller on the main board can execute the operation of the drive mechanism corresponding to the front panel. It is therefore possible to reduce the total cost including design and development cost and a mold cost to a large extent.

What is claimed is:

1. A vehicle-loaded audio device comprising one selected from among drive mechanisms for various players, a front panel having an insertion opening for a medium corresponding to said selected one of the drive mechanisms, a main chassis for supporting said front panel and said drive mechanism, and a main board attached to said main chassis,
said main board including a connector for connecting said main board and said drive mechanism, a writing unit into which a program for operating said selected drive mechanism is written, and a circuit unit common to said various players.

2. A vehicle-loaded audio device according to claim 1, wherein at least one control key for operating said drive mechanism is disposed on said front panel, and said front panel is connected to said main board with a front panel-mated connector provided on said main board.

3. A vehicle-loaded audio device according to claim 1, wherein said drive mechanism is attached to said main chassis through an intermediate bracket.

4. A vehicle-loaded audio device according to claim 1, wherein at least two of said drive mechanisms for the various players are attached to said main chassis at different mount positions, and when the mount position of said selected drive mechanism differs from a preset mount position, said selected drive mechanism is attached to said main chassis through an intermediate bracket.

5. A vehicle-loaded audio device according to claim 1, wherein said drive mechanism is connected to said main board with a connector through a flexible cable.

6. A vehicle-loaded audio device according to claim 1, wherein at least two of said drive mechanisms for the various players are connected to said main board at different positions, and when the connecting position of said selected drive mechanism differs from a preset connector position on said main board, said selected drive mechanism is connected to said main board through a flexible cable.

7. A vehicle-loaded audio device according to claim 1, wherein said writing unit is formed of a flash ROM allowing the program to be written therein at least once.

8. A vehicle-loaded audio device comprising one selected from among drive mechanisms for various players, a front panel having an insertion opening for a medium corresponding to said selected one of the drive mechanisms, a main chassis for supporting said front panel and said drive mechanism, and a main board attached to said main chassis, said main board including a drive mechanism-mated connector for connecting said main board and said drive mechanism, a front panel-mated connect or for connecting said main board and said front panel, a writing unit into which a program for operating said selected drive mechanism is written, and a circuit unit common to said various players.

9. A vehicle-loaded audio device according to claim 8, wherein at least one control key for operating said drive mechanism is disposed on said front panel.

10. A vehicle-loaded audio device according to claim 8, wherein said drive mechanism is attached to said main chassis through an intermediate bracket.

11. A vehicle-loaded audio device according to claim 8, wherein at least two of said drive mechanisms for the various players are attached to said main chassis at different mount positions, and when the mount position of said selected drive mechanism differs from a preset mount position, said selected drive mechanism is attached to said main chassis through an intermediate bracket.

12. A vehicle-loaded audio device according to claim 8, wherein said drive mechanism is connected to said main board with a connector through a flexible cable.

13. A vehicle-loaded audio device according to claim 8, wherein at least two of said drive mechanisms for the various players are connected to said main board at different positions, and when the connecting position of said selected drive mechanism differs from a preset connector position on said main board, said selected drive mechanism is connected to said main board through a flexible cable.

14. A vehicle-loaded audio device according to claim 8, wherein said writing unit is formed of a flash ROM allowing the program to be written therein at least once.

15. A vehicle-loaded audio device comprising one selected from among drive mechanisms for various players, a front panel having an insertion opening for a medium corresponding to said selected one of the drive mechanisms, a main chassis for supporting said front panel and said drive mechanism, and a main board attached to said main chassis, said main board including a connector for connecting said main board and said drive mechanism, a writing unit, and a circuit unit common to said various players, said writing unit storing a predetermined program for operating said selected drive mechanism that is written therein after said drive mechanism has been selected.

16. A vehicle-loaded audio device according to claim 15, wherein said writing unit is formed of a flash ROM allowing the program to be written therein at least once.

17. A method for manufacturing a desired one of a plurality of audio devices having certain common components, comprising:

providing a main chassis that is common to said plurality of audio devices;

providing a main board that is common to said plurality of audio devices, said main board being attachable to said main chassis; and selecting a drive mechanism for the desired audio device from among the drive mechanisms for said plurality of audio devices, said selected drive mechanism being attachable to said main chassis and electrically connectable to said main board;

wherein said main board includes a writing unit into which a program for operating said selected drive mechanism is written.

18. A method according to claim 17 further comprising:

selecting a front panel for the desired audio device from among the front panels for said plurality of audio devices, said selected front panel having an insertion opening for a medium corresponding to said selected drive mechanism and being electrically connectable to said main board.

19. A method according to claim 17 wherein said selected drive mechanism is attachable to said main chassis through an intermediate bracket.

20. A method according to claim 17 wherein said selected drive mechanism is connectable to said main board through a flexible cable.

21. A method according to claim 17 wherein said writing unit is a flash ROM.

* * * * *